WILLIAM D. CUTLER, OF PHILADELPHIA, PENNSYLVANIA.

Letters Patent No. 83,836, dated November 10, 1868.

IMPROVED ARTICLE OF FOOD PREPARED FROM FISH AND POTATOES.

The Schedule referred to in these Letters Patent and making part of the same.

*To whom it may concern:*

Be it known that I, WILLIAM D. CUTLER, of Philadelphia, in the county of Philadelphia, and State of Pennsylvania, have, as I believe, invented a new and useful Preparation of Potato and Fish, as a new article of commerce; and I do hereby declare the following to be a full and exact description of the same, and the method of producing it.

My invention consists in the preparation of a new commercial article, made of desiccated fish and potatoes.

The process is to grind or otherwise break up the potatoes, press, to remove more or less of the water, then desiccate thoroughly, and mix therewith a portion, one-third, more or less, of ordinary salt fish, which has had the skin and bones removed, been ground or broken fine, and thoroughly desiccated.

This mixture may, if thought desirable, be made of the boned and broken fish and the pressed potatoes before drying, subjecting the whole to the desiccating process afterwards.

For long keeping or shipment, the article should be put up in air-tight encasements.

The drying may be upon pans with perforated bottoms, or wire sieves, in hot air-chambers, or by such other methods as may be found desirable in practice.

What I claim as of my invention, and desire to secure by Letters Patent, is—

The within-described mixture of desiccated potato and fish, as a new commercial article.

In testimony whereof, I have signed my name to this specification, in the presence of two subscribing witnesses.

WM. D. CUTLER.

Witnesses:
H. W. HUNTINGTON,
D. C. COLBY.